US00RE43179E

(19) United States
(12) Reissued Patent
Watanabe et al.

(10) Patent Number: US RE43,179 E
(45) Date of Reissued Patent: Feb. 14, 2012

(54) OPTICAL DISK DRIVE FOR DISCRIMINATING TYPES OF OPTICAL DISKS

(75) Inventors: Katsuya Watanabe, Ehime (JP); Hiroshige Ishibashi, Osaka (JP); Takashi Kishimoto, Nara (JP); Rie Takahashi, Osaka (JP)

(73) Assignee: Panasonic Corporation, Osaka (JP)

(21) Appl. No.: 13/044,808

(22) Filed: Mar. 10, 2011

Related U.S. Patent Documents

Reissue of:
(64) Patent No.: 7,804,753
Issued: Sep. 28, 2010
Appl. No.: 11/575,322
PCT Filed: Jan. 19, 2006
PCT No.: PCT/JP2006/300721
§ 371 (c)(1),
(2), (4) Date: Mar. 15, 2007
PCT Pub. No.: WO2006/077916
PCT Pub. Date: Jul. 27, 2006

(30) Foreign Application Priority Data

Jan. 24, 2005 (JP) ..... 2005-015080

(51) Int. Cl.
*G11B 7/00* (2006.01)
(52) U.S. Cl. ..... 369/53.37; 369/47.39; 369/53.23
(58) Field of Classification Search .... 369/44.24–44.31, 369/44.35–44.39, 47.15, 47.38–47.39, 47.45, 369/47.49–47.5, 47.55, 53.2, 53.22–53.23, 369/53.37
See application file for complete search history.

(56) References Cited

U.S. PATENT DOCUMENTS 5,963,523 A 10/1999 Kayama et al.
5,986,985 A 11/1999 Kawamura et al.
6,262,957 B1 7/2001 Inoue et al.
6,385,149 B1 5/2002 Sekii
6,414,924 B1 7/2002 Jin
6,510,115 B2 1/2003 Furuichi et al.
6,747,931 B1 6/2004 Park
6,826,139 B1 11/2004 Oh et al.
(Continued)

FOREIGN PATENT DOCUMENTS

EP 1 463 053 3/2004
(Continued)

OTHER PUBLICATIONS

Extended European Search Report issued on Jul. 22, 2008 for corresponding European Patent Application No. 06711967.7.
(Continued)

*Primary Examiner* — Nathan Danielsen
(74) *Attorney, Agent, or Firm* — Renner, Otto, Boisselle & Sklar, LLP

(57) ABSTRACT

After an optical disk drive according to the present invention has been loaded with an optical disk and before the operation of recognizing the type of the given disk is finished, the drive presumes one of multiple types of candidate optical disks, from/on which data is readable and writable using a light beam with the shortest wavelength among the candidate disks, to be the disk being driven by the motor now and gets the beam for the presumed type of disk radiated from a light source (Step (A)). Next, the drive gets the disk spun at a rotational velocity that realizes a linear velocity equal to or higher than a standardized normal velocity when data is read from the presumed type of disk (Step (B)). Thereafter, the drive starts a focus control in a situation where the spot of the beam being formed on the disk is moving on the disk at the linear velocity equal to or higher than the normal velocity (Step (C)). And then the drive performs the operation of recognizing the type of the disk by the light beam reflected from the disk under the focus control (Step (D)).

24 Claims, 6 Drawing Sheets

U.S. PATENT DOCUMENTS

| | | | |
|---|---|---|---|
| 2004/0004922 | A1 | 1/2004 | Selinfreund et al. |
| 2004/0037197 | A1 | 2/2004 | Fujiune et al. |
| 2004/0071060 | A1 | 4/2004 | Suh et al. |
| 2004/0190417 | A1 | 9/2004 | Watanabe et al. |
| 2004/0240357 | A1 | 12/2004 | Takeya |

FOREIGN PATENT DOCUMENTS

| | | |
|---|---|---|
| JP | 10-011890 | 1/1998 |
| JP | 10-214451 | 8/1998 |
| JP | 2000-315355 | 11/2000 |
| JP | 2004-311004 | 3/2004 |
| JP | 2004-111028 | 4/2004 |
| JP | 2004-311004 | 11/2004 |

OTHER PUBLICATIONS

International Search Report for corresponding Application No. PCT/JP2006/300721 mailed Apr. 25, 2006.

Form PCT/ISA/237 and a concise explanation for corresponding International Application No. PCT/JP2006/300721 dated Apr. 26, 2006.

Form PCT/ISA1237 and a concise explanation.

OPTICAL DISK DRIVE FOR DISCRIMINATING TYPES OF OPTICAL DISKS

Matter enclosed in heavy brackets [ ] appears in the original patent but forms no part of this reissue specification; matter printed in italics indicates the additions made by reissue.

TECHNICAL FIELD

The present invention relates to an optical disk drive for reading and/or writing data from/on a spinning disklike information storage medium (which will be referred to herein as an "optical disk"). More particularly, the present invention relates to an optical disk drive that can properly recognize the type of a given optical disk that has been selected among multiple types of optical disks complying with mutually different standards.

BACKGROUND ART

In optical disk technologies, data can be read out from a rotating optical disk by irradiating the disk with a relatively weak light beam with a constant intensity, and detecting the light that has been modulated by, and reflected from, the optical disk.

On a read-only optical disk, information is already stored as pits that are arranged spirally during the manufacturing process of the optical disk. On the other hand, on a rewritable optical disk, a recording material film, from/on which data can be read and written optically, is deposited by an evaporation process, for example, on the surface of a substrate on which tracks with spiral lands or grooves are arranged. In writing data on such a rewritable optical disk, data is written there by irradiating the optical disk with a light beam, of which the optical power has been changed according to the data to be written, and locally changing the property of the recording material film.

It should be noted that the depth of the pits, the depth of the tracks, and the thickness of the recording material film are all smaller than the thickness of the optical disk substrate. For that reason, those portions of the optical disk, where data is stored, define a two-dimensional plane, which is sometimes called an "information plane". However, considering that such an "information plane" has a physical dimension in the depth direction, too, the term "information plane" will be replaced herein by another term "information storage layer". Every optical disk has at least one such information storage layer. Optionally, a single information storage layer may actually include a plurality of layers such as a phase-change material layer and a reflective layer.

To read data that is stored on an optical disk or to write data on a recordable optical disk, the light beam always needs to maintain a predetermined converging state on a target track on an information storage layer. For that purpose, a "focus control" and a "tracking control" are required. The "focus control" means controlling the position of an objective lens perpendicularly to the information storage layer (which direction will be referred to herein as a "substrate depth direction") such that the focus position (or converging point) of the light beam is always located on the information storage layer. On the other hand, the "tracking control" means controlling the position of the objective lens along the radius of a given optical disk (which direction will be referred to herein as a "disk radial direction") such that the light beam spot is always located right on a target track.

Various types of optical disks such as DVD (digital versatile disc)-ROM, DVD-RAM, DVD-RW, DVD-R, DVD+RW and DVD+R have become more and more popular these days as storage media on which a huge amount of information can be stored at a high density. Among other things, CDs (compact discs) are still popular now. Currently, next-generation optical disks, including Blu-ray disc (BD), which can store an even greater amount of information at a much higher density, are under development, and some of them have already been put on the market.

The structures of these optical disks change from one type to another. For example, these optical disks are different in physical track structure, track pitch, and depth of the information storage layer (i.e., the distance from the surface of the optical disk, through which the incoming light enters the disk, to the information storage layer). To read or write data properly from/on these multiple types of optical disks with those various physical structures, the information storage layer of each of these optical disks needs to be irradiated with a laser beam with an appropriate wavelength by using an optical system that has a numerical aperture (NA) associated with the specific type of the disk.

FIG. 1 is a perspective view schematically illustrating an optical disk 200. Just for reference, an objective lens (converging lens) 220 and a laser beam 222 that has been converged by this objective lens 220 are shown in FIG. 1. The laser beam 222 passes through the light-incoming side of the optical disk 200 and is converged onto the information storage layer, thereby forming a light beam spot on the information storage layer.

FIGS. 2(a), 2(b) and 2(c) schematically illustrate cross sections of a CD, a DVD and a BD, respectively. Each of these optical disks shown in FIG. 2 has a principal surface (i.e., light-incoming side) 200a and a back surface (i.e., a label side) 200b and includes at least one information storage layer 214 between these surfaces. On the back surface 200b of the optical disk, arranged is a label layer 218 on which the title, graphics, and so on have been printed. Any of these optical disks has an overall thickness of 1.2 mm and a diameter of 12 cm. For the sake of simplicity, pits, grooves and other unevenness are not shown in FIG. 2 and the reflective layer is not shown there, either.

The CD's information storage layer 214 shown in FIG. 2(a) is located at a depth of about 1.1 mm as measured from the principal surface 200a. To read data from the CD's information storage layer 214, an infrared laser beam (with a wavelength of 785 nm) needs to be converged such that its focal point is located right on the information storage layer 214 by focus control. The objective lens for use to converge the infrared laser beam needs to have a numerical aperture (NA) of approximately 0.5.

The DVD's information storage layer 214 shown in FIG. 2(b) is located at a depth of approximately 0.6 mm as measured from the principal surface 200a. In an actual DVD, two substrates, each having a thickness of approximately 0.6 mm, are boned together with an adhesive layer. In an optical disk with two information storage layers 214, the respective distances from the principal surface 200a to the information storage layers 214 are in the range of approximately 0.57 mm to approximately 0.63 mm. That is to say, those two information storage layers are located very close to each other. That is why only one information storage layer 214 is shown in FIG. 2(b), no matter how many information storage layers 214 are actually included. To read and write data from/on the DVD's information storage layer 214, a red laser beam (with a wavelength of 660 nm) needs to be converged such that its focal point is located right on the information storage layer 214 by focus control. The objective lens for use to converge the red laser beam needs to have a numerical aperture (NA) of approximately 0.6.

The BD shown in FIG. 2(c) includes a thin coating layer (light transmitting layer) with a thickness of approximately 75 μm to approximately 100 μm on the principal surface 200a and its information storage layer 214 is located at a depth of about 0.1 mm as measured from the principal surface 200a. To read data from the BD's information storage layer 214, a blue laser beam (with a wavelength of 405 nm) needs to be converged such that its focal point is located right on the information storage layer 214 by focus control. The objective lens for use to converge the blue laser beam needs to have a numerical aperture (NA) of approximately 0.85.

Currently, these various types of optical disks are on the market and used extensively. Under the circumstances like these, a single optical disk drive should read from, and write to, as many types of optical disks as possible. For that purpose, the optical disk drive should include a light source and an optical system, both of which can deal with multiple types of optical disks, and should appropriately recognize the type of the optical disk that has been loaded into the optical disk drive.

The optical disk drive disclosed in Patent Document No. 1 recognizes the type of the given optical disk by optically detecting the depth of the information storage layer of that optical disk. Portion (a) of FIG. 3 schematically illustrates how the gap between the principal surface 200a of the optical disk 200 and the objective lens 220 decreases gradually. This optical disk 200 includes a substrate 212, which is transparent to a laser beam, an information storage layer 214 that has been formed on the substrate 212, and a protective layer (coating layer) 216 that covers the information storage layer 214. The optical disk 200 illustrated in portion (a) of FIG. 3 corresponds to a BD and the coating layer 216 has a thickness of about 0.1 mm. There is a label layer 218 on which an image, characters and so on are printed, on the back surface 200b of the optical disk. It should be noted that the thickness of the label layer 218 is not to scale.

Portion (a) of FIG. 3 illustrates a situation where the focal point of the laser beam 222 is located on the surface 200a of the optical disk, a situation where the focal point of the laser beam 222 is located on the information storage layer 214, and a situation where the focal point of the laser beam 222 is located inside the substrate 212. Portion (b) of FIG. 3 schematically shows a focus error (FE) signal to be generated when the focal point of the laser beam 222 varies with time. The FE signal changes so as to draw a small S-curve when the focal point of the laser beam 222 passes the surface 200a of the optical disk 200. On the other hand, when the focal point of the laser beam 222 passes the information storage layer 214 of the optical disk 200, the FE signal changes so as to draw a big S-curve. Portion (c) of FIG. 3 schematically shows the amplitude of a radio frequency (RF) read signal to be generated when the focal point of the laser beam 222 varies with time. It can be determined that the focal point of the laser beam 222 is located on the information storage layer 114 when the amplitude of the RF signal shows a non-zero significant value and when the FE signal goes zero. If the focus servo is turned ON in such a situation, the position of the objective lens is controlled such that the FE signal is always equal to zero. Such an operation of turning the focus servo ON around the center of the S-curve of the FE signal (i.e., near the zero-cross point of the FE signal) when the S-curve is detected while a focus search is being carried out in search of the information storage layer will be referred to herein as a "focus finding operation".

The position of the objective lens when the S-curve of the FE signal is detected can be determined by reference to the electrical signal being supplied to the actuator that is controlling the position of the objective lens. As a result, the depth of the information storage layer 214 can be detected, and eventually, the type of the given optical disk can be recognized by the depth of the information storage layer 214.

Meanwhile, even when an optical disk is being irradiated with a light beam with relatively small power to read data from it, a low rotational velocity of the motor might destroy the data that is stored in the information storage layer of a rewritable optical disk. Such a deterioration of an information storage layer caused by the light beam for reading is called "read beam induced deterioration". Patent Document No. 2 discloses a technique of minimizing the read beam induced deterioration that could possibly occur while the target track is being searched for.

Patent Document No. 1: Japanese Patent Application Laid-Open Publication No. 2004-111028

Patent Document No. 2: Japanese Patent Application Laid-Open Publication No. 10-11890 (see Paragraphs Nos. 9 through 47 and FIGS. 1 and 2, in particular)

DISCLOSURE OF INVENTION

Problems to be Solved by the Invention

As shown in FIGS. 2(a), 2(b) and 2(c), the BD, DVD and CD have mutually different distances between the principal surface 200a of the optical disk 200 and its information storage layer 214. That is why the type of the given optical disk can be recognized by the interval between the two S-curves appearing on the FE signal shown in FIG. 3(b).

In the prior art, it has been proposed that such optical disk type recognition be done using an infrared light beam for use to read a CD. This is because the CD has a long distance from its principal surface 200a to its information storage layer 214. That is to say, the optical system is designed such that the focal point of the light beam reaches the information storage layer 214 that is located at a deep level in the optical disk 200. And by moving the objective lens 220, the FE signal can be detected in virtually the entire thickness of the optical disk. Conversely, the BD has a short distance from its principal surface 200a to its information storage layer 214. Thus, if an optical system for BDs is used, its objective lens has too short a focal length for the focal point of the light beam to reach the information storage layer of a DVD or a CD.

Also, a blue ray with a short wavelength has higher energy than a red ray or an infrared ray. Thus, if an optical disk irradiated with the blue ray in a focus controlled state is a recordable CD or DVD, then the storage state of its information storage layer will be affected so seriously to cause the read beam induced deterioration particularly easily. To avoid such read beam induced deterioration, disk type recognition should be carried out using a red or infrared ray with relatively low energy. The reason is that even if the BD is irradiated with a red or infrared light beam, the storage layer of the BD can hardly deteriorate because the aberration is too large to focus the beam sharply.

For these reasons, it has been believed that a light beam with a long focal length and a long wavelength with low energy must be used to get the disk type recognition done.

However, when the present inventors actually carried out the disk type recognition using a red or infrared light beam, we discovered that errors happened frequently in the type of the disk recognized due to a variation in the surface reflectivity of the optical disk, for example.

In order to overcome the problems described above, a primary object of the present invention is to provide an optical disk drive that can recognize the type of the given optical disk with increased reliability.

Means for Solving the Problems

An optical disk drive according to the present invention reads and writes data from/on multiple types of optical disks. The drive includes: a motor to rotate one of the optical disks thereon; an optical head including a light source for radiating a plurality of light beams with mutually different wavelengths and a photodetector for generating an electrical signal based on at least a part of the light beam that has been reflected from the optical disk; and a control section for performing an operation of recognizing the type of the optical disk, a focus control operation and a tracking control operation by controlling the operations of the optical head and the motor. The control section performs the steps of: (A) after the optical disk drive has been loaded with the optical disk and before the operation of recognizing the type of the optical disk is finished, presuming one of the multiple types of candidate optical disks, from/on which data is readable and writable using a light beam with the shortest wavelength among the candidate disks, to be the optical disk being driven by the motor now and getting the light beam for the presumed type of optical disk radiated from the light source; (B) getting the optical disk spun at a rotational velocity that realizes a linear velocity that is equal to or higher than a standardized normal velocity when data is read from the presumed type of optical disk; (C) starting a focus control in a situation where the spot of the light beam being formed on the optical disk is moving on the optical disk at the linear velocity that is equal to or higher than the normal velocity; and (D) performing the operation of recognizing the type of the optical disk by the light beam that has been reflected from the optical disk under the focus control.

In one preferred embodiment, after the step (A) has been performed and before the focus control or the tracking control is started, a spot of the light beam is formed on the optical disk and the operation of recognizing the type of the optical disk by the light beam that has been reflected from the optical disk is started.

In another preferred embodiment, on finding the type of the optical disk being driven by the motor different from that of the optical disk, from/on which data is going to be read or written using the light beam, after having performed the steps (A) through (D), the control section performs the steps of: (A') switching the light beam into a second light beam having a longer wavelength than the light beam, and getting the second light beam radiated from the light source; (B') getting the optical disk spun at a rotational velocity that realizes a linear velocity that is equal to or higher than the standardized normal velocity of the optical disk, from/on which data is going to be read or written using the second light beam; (C') starting a focus control in a situation where the spot of the second light beam being formed on the optical disk is moving on the optical disk at the linear velocity that is equal to or higher than the normal velocity; and (D') performing the operation of recognizing the type of the optical disk by the light beam that has been reflected from the optical disk under the focus control.

In this particular preferred embodiment, after the step (A') has been performed, a spot of the second light beam is formed on the optical disk and the operation of recognizing the type of the optical disk by the second light beam that has been reflected from the optical disk is started.

In another preferred embodiment, on finding the type of the optical disk being driven by the motor different from that of the optical disk, from/on which data is going to be read or written using the second light beam, after having performed the steps (A) through (D) and the steps (A') through (D'), the control section performs the steps of: (A") switching the light beam into a third light beam having a wavelength that is longer than that of the light beam that was radiated from the light source in the step (A) and that is different from that of the second light beam, and getting the third light beam radiated from the light source; (B") getting the optical disk spun at a rotational velocity that realizes a linear velocity that is equal to or higher than the standardized normal velocity of the optical disk, from/on which data is going to be read or written using the third light beam; (C") starting a focus control in a situation where the spot of the third light beam being formed on the optical disk is moving on the optical disk at the linear velocity that is equal to or higher than the normal velocity; and (D") performing the operation of recognizing the type of the optical disk by the light beam that has been reflected from the optical disk under the focus control.

In this particular preferred embodiment, after the step (A') has been performed, a spot of the third light beam is formed on the optical disk and the operation of recognizing the type of the optical disk by the third light beam that has been reflected from the optical disk is started.

In still another preferred embodiment, the control section gets the light beam with a wavelength of 410 nm or less radiated from the light source in the step (A).

In a specific preferred embodiment, the control section gets the optical disk spun at a rotational velocity that realizes a linear velocity of 5.28 m/s or more in the step (B).

In yet another preferred embodiment, the control section gets the light beam with a wavelength of 410 nm or less and the second light beam, having a wavelength for DVDs, radiated from the light source in the steps (A) and (A'), respectively.

In a specific preferred embodiment, the control section gets the optical disk spun at a rotational velocity that realizes a linear velocity of 5.28 m/s or more in the step (B) and at a rotational velocity that realizes a linear velocity of 3.87 m/s or more in the step (B'), respectively.

In yet another preferred embodiment, the control section gets the light beam with a wavelength of 410 nm or less and the second light beam, having a wavelength for CDs, radiated from the light source in the steps (A) and (A'), respectively.

In this particular preferred embodiment, the control section gets the optical disk spun at a rotational velocity that realizes a linear velocity of 5.28 m/s or more in the step (B) and at a rotational velocity that realizes a linear velocity of 1.4 m/s or more in the step (B'), respectively.

In yet another preferred embodiment, the control section gets the light beam with a wavelength of 410 nm or less, the second light beam having a wavelength for CDs and the third light beam having a wavelength for DVDs radiated from the light source in the steps (A), (A') and (A"), respectively.

In this particular preferred embodiment, the control section gets the optical disk spun at a rotational velocity that realizes a linear velocity of 5.28 m/s or more in the step (B), at a rotational velocity that realizes a linear velocity of 1.4 m/s or more in the step (B'), and at a rotational velocity that realizes a linear velocity of 3.87 m/s or more in the step (B"), respectively.

EFFECTS OF THE INVENTION

An optical disk drive according to the present invention reads and writes data from/on multiple types of recordable optical disks such as CDs, DVDs and BDs. Even if the given optical disk has been recognized erroneously to get a laser beam with a shorter wavelength radiated and to activate a focus control, the rotational velocity when the drive is started is set at least equal to a predetermined velocity, thus preventing data from being destroyed due to read beam induced deterioration.

Figure 3:
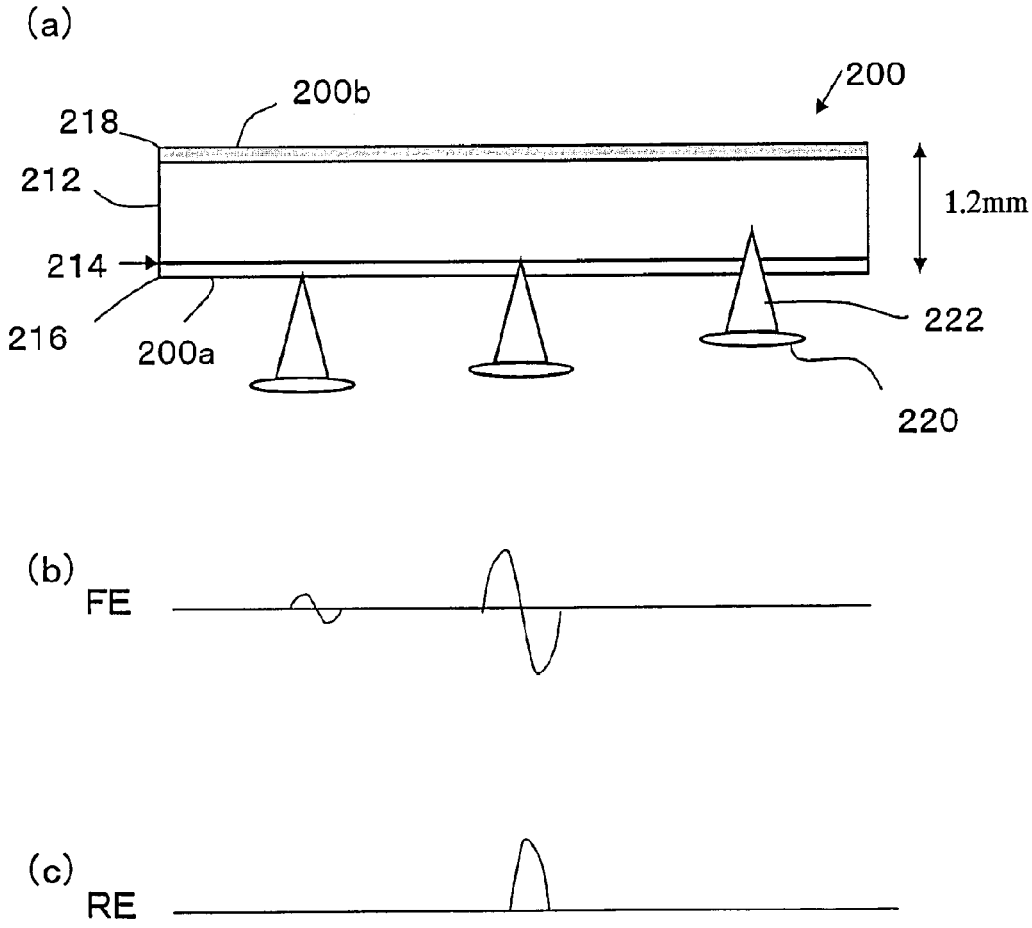

Portion (a) of FIG. 3 illustrates a situation where the focal point of the laser beam 222 is located on the surface 200a of the optical disk, a situation where the focal point of the laser beam 222 is located on the information storage layer 214, and a situation where the focal point of the laser beam 222 is located inside the substrate 212;

Portion (b) of FIG. 3 schematically shows a focus error (FE) signal to be generated when the focal point of the laser beam 222 varies with time; and Portion (c) of FIG. 3 schematically shows the amplitude of a radio frequency (RF) signal to be generated when the focal point of the laser beam 222 varies with time.

Figure 4:
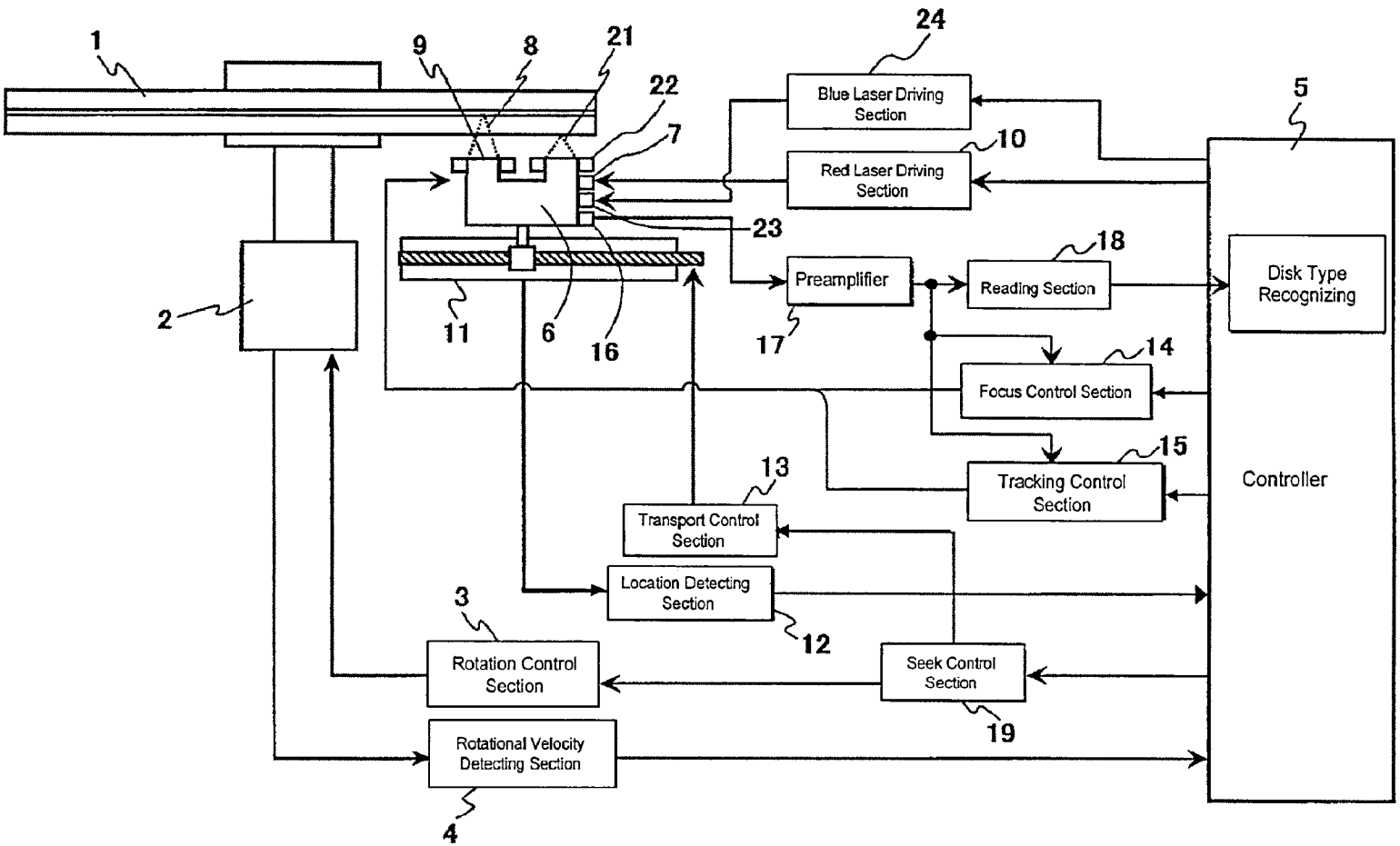

FIG. 4 shows a first preferred embodiment of an optical disk drive according to the present invention.

Figure 5A:
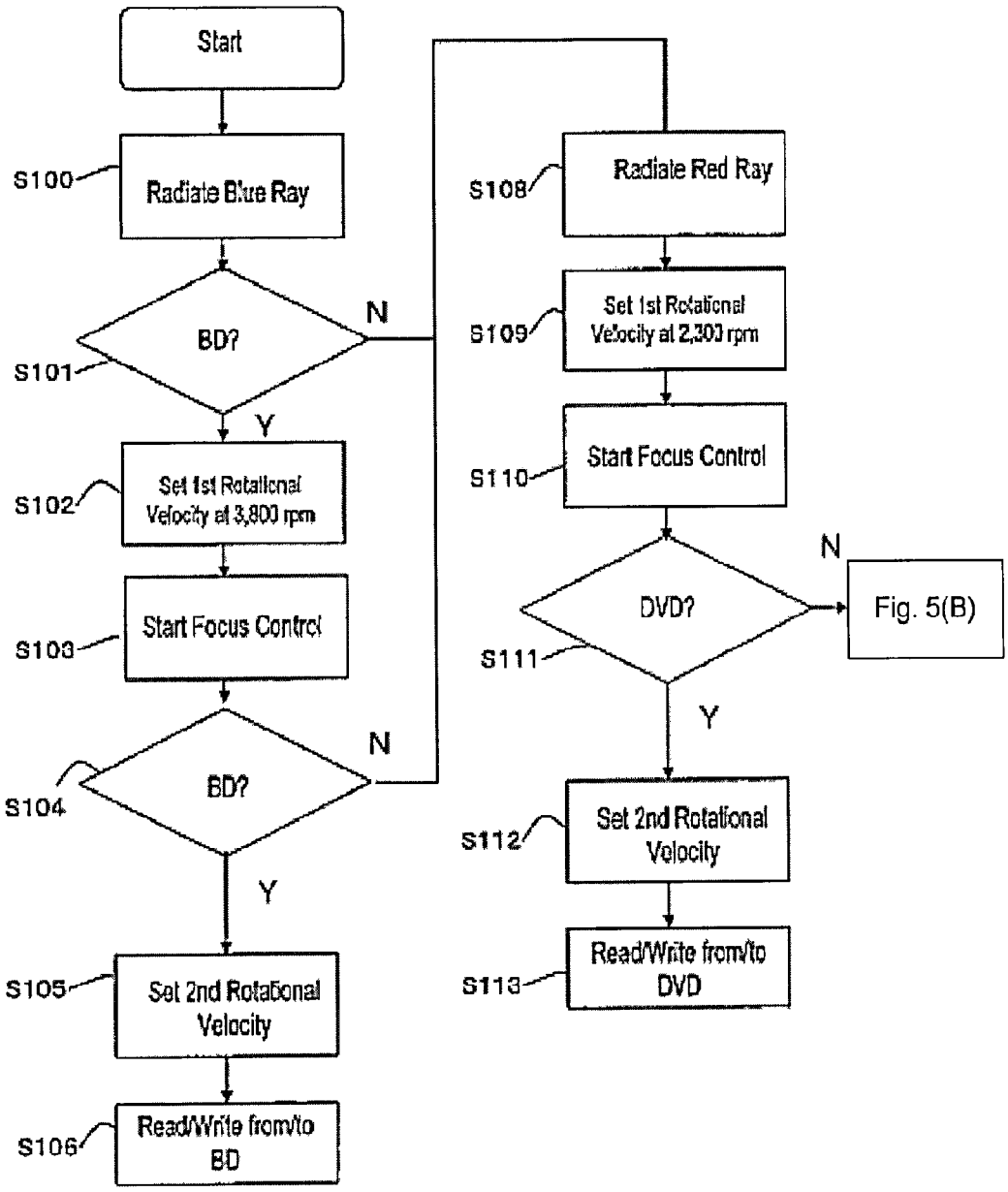
Figure 5B:
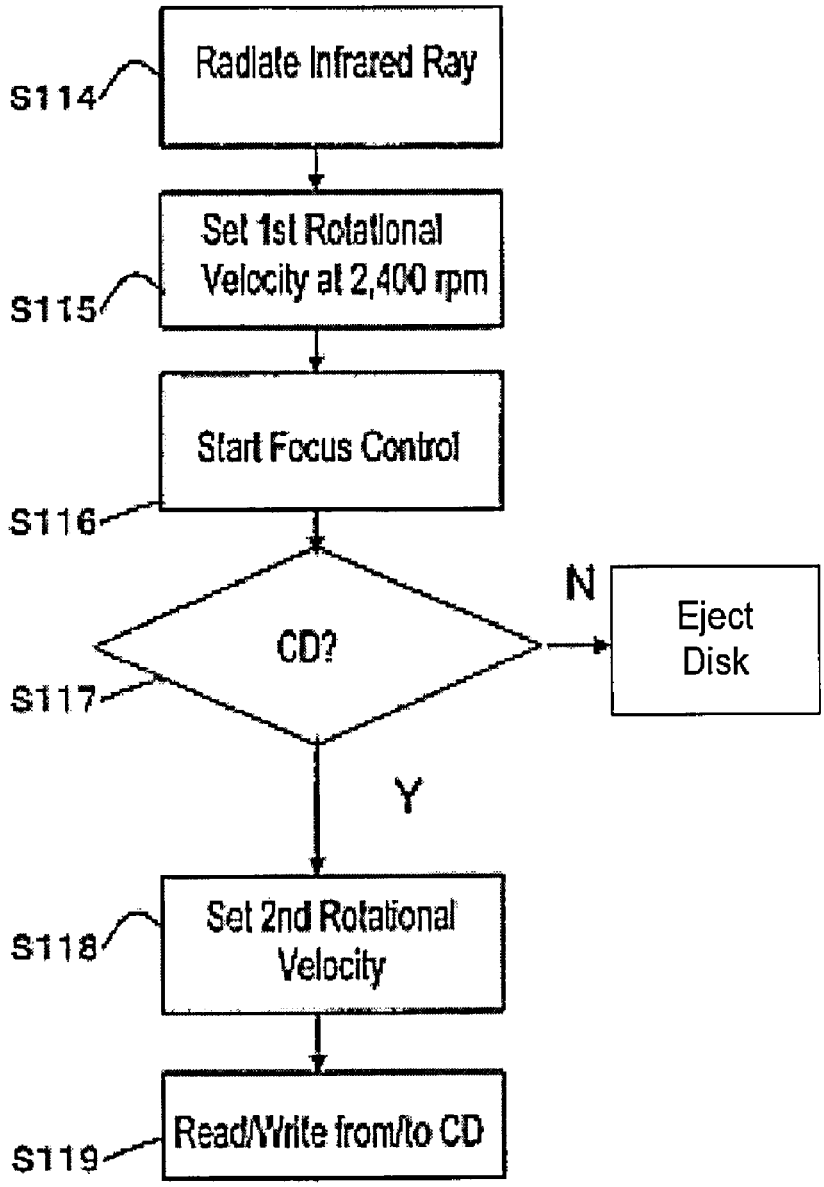

FIGS. 5A and 5B are flowcharts showing the procedure of processing to be done in the first preferred embodiment.

Figure 6:
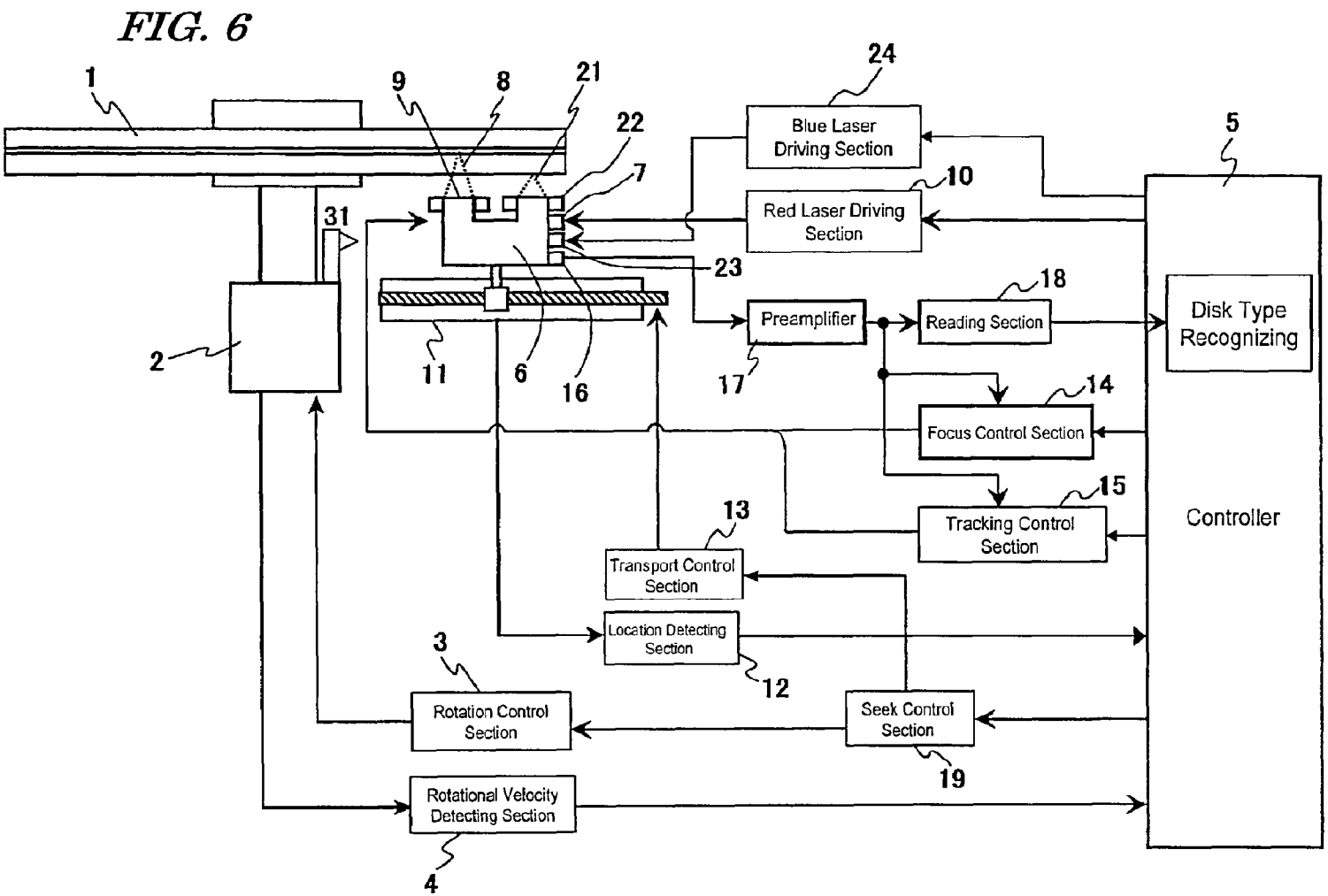

FIG. 6 shows a second preferred embodiment of an optical disk drive according to the present invention.

DESCRIPTION OF REFERENCE NUMERALS

1 optical disk
2 motor
3 rotation control section
4 rotational velocity detecting section
5 controller
6 optical head
7 red laser
8 light beam
9 objective lens (red)
10 red laser driving section
11 transport stage
13 transport control section
14 focus control section
15 tracking control section
16 photodetector
17 preamplifier
18 reading section
19 seek control section
21 light beam
22 objective lens (blue)
23 blue laser
24 blue laser driving section
200 optical disk
220 objective lens
222 laser beam

BEST MODE FOR CARRYING OUT THE INVENTION

In a preferred embodiment, the optical disk drive of the present invention tries recognizing the type of the given optical disk using a short-wave light beam (preferably a blue ray) contrary to the misconception that has been widespread in the art. In this case, by rotating the optical disk at a sufficiently high velocity (i.e., at a high rpm), the read beam induced deterioration can be avoided.

Hereinafter, the characteristic operation of the optical disk drive of the present invention will be described.

In the optical disk drive of the present invention, after the drive has been either started or loaded with an optical disk and before the operation of recognizing the type of the given optical disk is finished, one of multiple types of candidate optical disks, from/on which data is readable or writable using a light beam with the shortest wavelength among the candidate disks, is presumed to be the given optical disk, and the light beam for the presumed type of optical disk gets radiated from the light source in Step (A). In a preferred embodiment of the present invention using a three-wavelength multi-drive, the multiple types of candidate optical disks are supposed to have been manufactured so as to comply with respective standards for a BD, a DVD and a CD. Among these three types of optical disks, the optical disk, from/on which data can be read and written using a light beam with the shortest wavelength, is a BD. That is why in this case, a blue light beam is radiated from a blue ray emitting light source in Step (A).

Next, in a preferred embodiment of the present invention, before a focus control or a tracking control is started, a light beam spot is formed on the optical disk, and the operation of recognizing the type of the given optical disk by the light beam that has been reflected from the optical disk is started. More specifically, a focus error signal is detected with the objective lens moved perpendicularly to the optical disk and the number of S-curves is counted. By the number of these S-curves, it can be determined whether the disk loaded is a BD or not. An optical system for BDs has a high numerical aperture (NA) and a short distance from the objective lens to the focal point of the light beam. That is why if only one S-curve (except that caused on the disk surface) appears in the focus error signal as the objective lens moves in the axial direction (i.e., within a predetermined range), then the given optical disk can be recognized as a single-layer BD with only one information storage layer. And if there are two S-curves in the focus error signal, then the given optical disk may be recognized as a dual-layer BD with two information storage layers. This is because in an optical system for use to read and write data from/on BDs, the distance from the objective lens to the focal point of the light beam (i.e., the focal length) is too short for the focal point of the blue light beam to reach the information storage layer of a DVD or a CD. Thus, when the optical disk drive is loaded with a DVD or a CD, no S-curves will appear in the focus error signal.

As can be seen, by using the blue light beam, the type of the given optical disk can be recognized more accurately compared to the situation where a red light beam or an infrared light beam is used. Besides, even though a blue light beam with high energy is used, neither the focus control nor the tracking control has been started yet. That is why there is almost no concern about the read beam induced deterioration.

If the user inserted a CD upside down by mistake, then the information storage layer of the CD would be located as close to the focal point of the light beam as that of a BD inserted properly. In a light source and an optical system for BDs, however, the spherical aberration that has heavy dependence on the thickness of the substrate will have significant influence on the tracking error signal and on the focus error signal. That is why the focus error signal detected from the information storage layer of the CD that has been inserted upside down will have an S-curve with decreased amplitude and varied symmetry. For that reason, even the CD inserted upside down would not be likely recognized as a BD inserted properly as long as the disk type recognition is carried out using the light source and optical system for BDs. Optionally, the spherical aberration to be produced when a CD is inserted upside down can be exaggerated intentionally to get the recognition done more easily. Thus, it can be determined more accurately whether the given optical disk is a BD or a CD that has been inserted upside down. In a rare case, the focus control could be started on the information storage layer of the CD that has been inserted upside down. Even so, it can be determined after that by the tracking error signal whether the given optical disk is truly a BD or not.

Hereinafter, it will be further described what if a BD has been inserted.

In that case, once a focus control is started on the information storage layer of the given optical disk, the focal point of the light beam will always be located on the information storage layer. Then, high energy will be concentrated on that information storage layer, thus causing the read beam induced deterioration easily. Before the focus control is started, however, the read beam induced deterioration is less likely caused irrespective of the rotational velocity of the optical disk.

Next, when data is read from one of those multiple types of candidate optical disks, the optical disk is spun at a rotational velocity that realizes a linear velocity that is equal to or higher than a standardized normal velocity in Step (B). This processing step is performed to increase the rotational velocity of the optical disk to a sufficiently high level and decrease the energy of the incident light being given to each unit area of the information storage layer before the focus control is started and thereby avoid the read beam induced deterioration while the focus control is performed. As described above, once the focus control is started, the focal point of the light beam will always be located on the information storage layer and high energy will be given to the information storage layer efficiently. However, if the rotational velocity of the optical disk is increased sufficiently before the focus control is started, then the read beam induced deterioration can be minimized even after the focus control and tracking control have been started.

The standardized normal linear velocities of a beam spot for BDs, DVDs and CDs are in the range of 5.280 m/s to 4.554 m/s, in the range of 3.46 m/s to 3.87 m/s, and in the range of 1.2 m/s to 1.4 m/s, respectively. When a blue light beam is used, the optical disk is turned at a rotational velocity of at least 2,100 rpm corresponding to the linear velocity of 5.28 m/s (which will be referred to herein as a "first rotational velocity").

Optionally, Step (B) may be carried out before Step (A). The key point is that the rotational velocity of the motor needs to be increased sufficiently before the focus control is started.

Next, a focus control is started in a situation where the spot of the light beam being formed on the optical disk is moving on the optical disk at the linear velocity that is equal to or higher than the normal velocity in Step (C). And then the operation of recognizing the type of the optical disk by the light beam that has been reflected from the optical disk is performed under the focus control in Step (D). More specifically, a tracking error signal is generated from the optical disk and it can be determined, by the amplitude of this tracking error signal, whether or not the given optical disk is actually associated with the radiated light beam.

For example, unless the given optical disk is a BD, no tracking error signal with sufficiently large amplitude will be generated while the focus control is being carried out with a blue light beam converged on the information storage layer. In that case, it is determined that the optical disk is not a BD. On the other hand, if the amplitude of the tracking error signal is equal to or greater than a predetermined level, then the optical disk loaded may be recognized as a BD. It should be noted that even if the optical disk loaded were a DVD or a CD, no read beam induced deterioration would be caused on the DVD or the CD because the rotational velocity of the optical disk is sufficiently high. Particularly if a CD-R or a CD-RW were inserted upside down and recognized erroneously as a BD as a result of an initial disk type recognition operation and even if the focus control were started, the read beam induced deterioration could still be minimized according to the present invention.

After the given optical disk has been recognized as a BD by reference to the tracking error signal, information can be further read from the optical disk and the type of the optical disk can be determined more specifically and more accurately. More particularly, address information is read from the optical disk and management information is acquired from a predetermined area. If the disk loaded is known to be a BD, the type of the disk can be finally determined, by reference to the management information, as a BD-ROM, a BD-RE or a BD-R.

Once the type of the given optical disk has been determined in this manner, the optical disk is turned at a rotational velocity associated with the type recognized (which will be referred to herein as a "second rotational velocity") in Step (E) according to a preferred embodiment. After that, a data read or write operation will be carried out by a known method.

As described above, according to the present invention, before a focus control operation is carried out based on a focus error signal, the rotational velocity of the optical disk is increased to a sufficiently high value (i.e., the first rotational velocity). That is why even though a blue light beam with a short wavelength and high energy is used, the disk type can still be recognized highly accurately without causing the read beam induced deterioration.

To start the focus control with the optical disk turned at a high rotational velocity, the optical disk needs to have specifications just as defined by the standard in terms of the substrate thickness, reflectance and so on. Some CDs and DVDs currently on the market may have poor quality. For example, if such an optical disk were turned at a high velocity of 3,000 rpm or more, then the focus finding operation sometimes could not be carried out. A BD, however, is a high-density optical disk that should be produced with high precision. Therefore, even if a BD is turned at a high velocity of 3,000 rpm or more, the focus finding operation can still be carried out just as intended.

Hereinafter, preferred embodiments of the present invention will be described with reference to the accompanying drawings.

Embodiment 1

A first preferred embodiment of an optical disk drive according to the present invention will be described now.

First, referring to FIG. 4, shown is a configuration for an optical disk drive according to this preferred embodiment.

The optical disk drive of this preferred embodiment is a three-wavelength multi drive that can read and write data from/on multiple types of optical disks. Examples of optical disks that can be handled according to this preferred embodiment include rewritable optical disks such as a Blu-ray Disc, a DVD-RW and a DVD-RAM and write-once optical disks such as a CD-R and a DVD-R. Address information specifying physical locations on the optical disk 1 is stored on the disk 1. Management information about each type of disk has already been recorded in a particular area (e.g., an innermost area of the disk) when the disk is shipped.

This optical disk drive of this preferred embodiment includes a motor 2 that turns the optical disk 1 thereon, an optical head 6 for accessing the optical disk 1 optically, and a control section for controlling the operations of the optical head 6 and the motor 2.

The motor 1 can turn the optical disk 1 at a predetermined rotational velocity (i.e., at predetermined revolutions per minute). The read/write methods of the optical disk are classifiable into CLV methods (including a Zone CLV method), in which the read/write operation is performed at a constant linear velocity, and CAV methods (including a Zone CAV method), in which the read/write operation is performed at a constant angular velocity. Music, image information and so on are preferably read or written at a constant data transfer rate, and therefore, by the CLV method. In the CLV method, the read/write operation is performed at a constant linear velocity. Therefore, while the light beam is following inner tracks, the control is carried out such that the optical disk is rotated at a high velocity. On the other hand, while the light beam is following outer tracks, the control is carried out such that the optical disk is rotated at a low velocity. Meanwhile, in the Zone CLV method, the optical disk is divided into multiple zones in the radial direction, and the control is carried out to keep the average linear velocity constant by making the rotational velocity constant within each of those zones but by varying the rotational velocities from one zone to another.

The rotational velocity of the optical disk 1 being turned by the motor 2 is controlled by a rotation control section 3 and the actual rotational velocity thereof is detected by a rotational velocity detecting section 4. The rotational velocity detecting section 4 sends a detection signal, showing the rotational velocity detected, to a controller 5.

The optical head 6 includes light sources (including a red semiconductor laser 7 and a blue semiconductor laser 23) for radiating multiple light beams 8 and 21 with different wavelengths, objective lenses 9 and 22 for converging the light beams 8 and 21, and a photodetector 16 for generating an electrical signal from at least a part of the light beam 8, 21 that has been reflected from the optical disk 1. The optical head 6 is supported on a transport stage 11. The optical disk drive of this preferred embodiment can also handle CDs. Thus, the optical head 6 further includes an infrared laser (not shown) that radiates an infrared light beam to irradiate a CD. However, the infrared laser is not shown for the sake of simplicity.

The red and blue lasers 7 and 23 as light sources are connected to a red laser driving section 10 and a blue laser driving section 24, respectively. The red laser driving section 10 controls the red semiconductor laser 7 such that the power of the red light beam 8 has an appropriate level for reading, writing or erasing. On the other hand, the blue laser driving section 24 controls the blue semiconductor laser 23 such that the power of the blue light beam 21 has an appropriate level for reading, writing or erasing.

The red light beam 8 is used to irradiate a DVD, while the blue light beam 21 is used to irradiate a BD. A CD is irradiated with an infrared light beam that has been radiated from an infrared laser (not shown). The infrared laser is controlled just like the other lasers.

The control section, of which the key component is the controller 5, controls the operations of the optical head 6, the motor 2 and other components, thereby performing the operation of recognizing the type of given optical disk 1, a focus control operation and a tracking control operation. The operation of the control section will be described in detail later. The respective functional blocks that form the control section may be implemented either by hardware only or as a combination of hardware and software.

The optical head 6 described above can make a traverse displacement in the disk radial direction by being transported by the transport stage 11. The displacement of the transport stage 11 is controlled by a transport control section 13. When the optical disk 1 is loaded into the optical disk drive, the transport stage 11 usually moves toward the innermost portion of the disk such that the focal point of the light beam is located on the innermost area (i.e., the management area) of the optical disk 1. To control the displacement of the optical head 6 quickly, the transport stage 11 preferably includes a linear motor. To enhance the shock resistance, however, the transport stage 11 may also have a ball screw mechanism.

The radial location of the light beam spot on the optical disk 1 is roughly found by the transport stage 11 and then finely determined by a lens actuator in the optical head 6. The radial location of the light beam spot on the optical disk 1 is detected by a location detecting section 12 that is attached to the transport stage 11. A detection signal representing the radial location detected is sent from the location detecting section 12 to the controller 5. When the controller 5 sends a transport instruction to a seek control section 19, the seek control section 19 outputs a control signal to the transport control section 13 and the rotation control section 3, thereby controlling the displacement of the transport stage 11 and the rotational velocity of the motor 2.

A focus control section 14 gets the focal point of the light beam 8 or 21 located on the target information storage layer of the optical disk 1. A tracking control section 15 makes the focal point of the light beam 8 or 21 follow the target track. As a result of the focus control and tracking control, even while the optical disk 1 is rotating at a high velocity, the focal point of the light beam can always follow the target track on the target information storage layer. The optical disk 1 causes some axial runout while rotating, thus varying the distance between the optical head 6 and the optical disk 1. However, while the focus control is ON, the axial position of the objective lens is finely adjusted by the actuator in the optical head 6 and the focal point of the light beam can always be located right on the target information storage layer.

The light beam 8, 21 that has been reflected from the optical disk 1 is converted by the photodetector 16 into an electrical signal. This electrical signal is amplified by a preamplifier 17 and then passed to a reading section 18 to decode information, to the focus control section 14 to feed back the focus error detected, and to the tracking control section 15 to feed back the tracking error detected, respectively.

The focus control section 14 and the tracking control section 15 control the actuator in the optical head 6 so as to minimize the respective absolute values of the focus error signal and the tracking error signal, thereby adjusting the positions of the objective lenses 9, 22.

Next, the processing flow of this preferred embodiment will be described with reference to FIGS. 5A and 5B.

Figure 1:
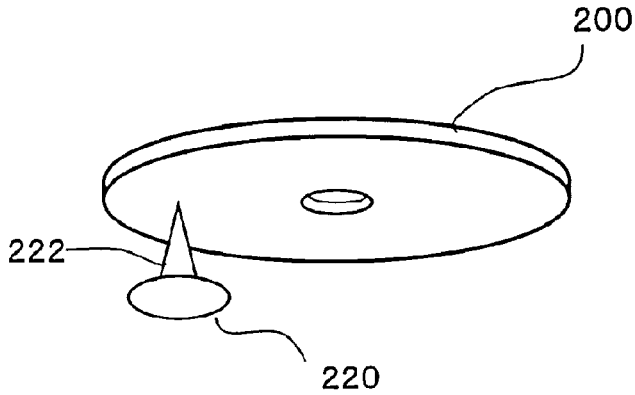
FIG. 1 is a perspective view schematically illustrating an arrangement of an objective lens with respect to an optical disk.
Figure 2:
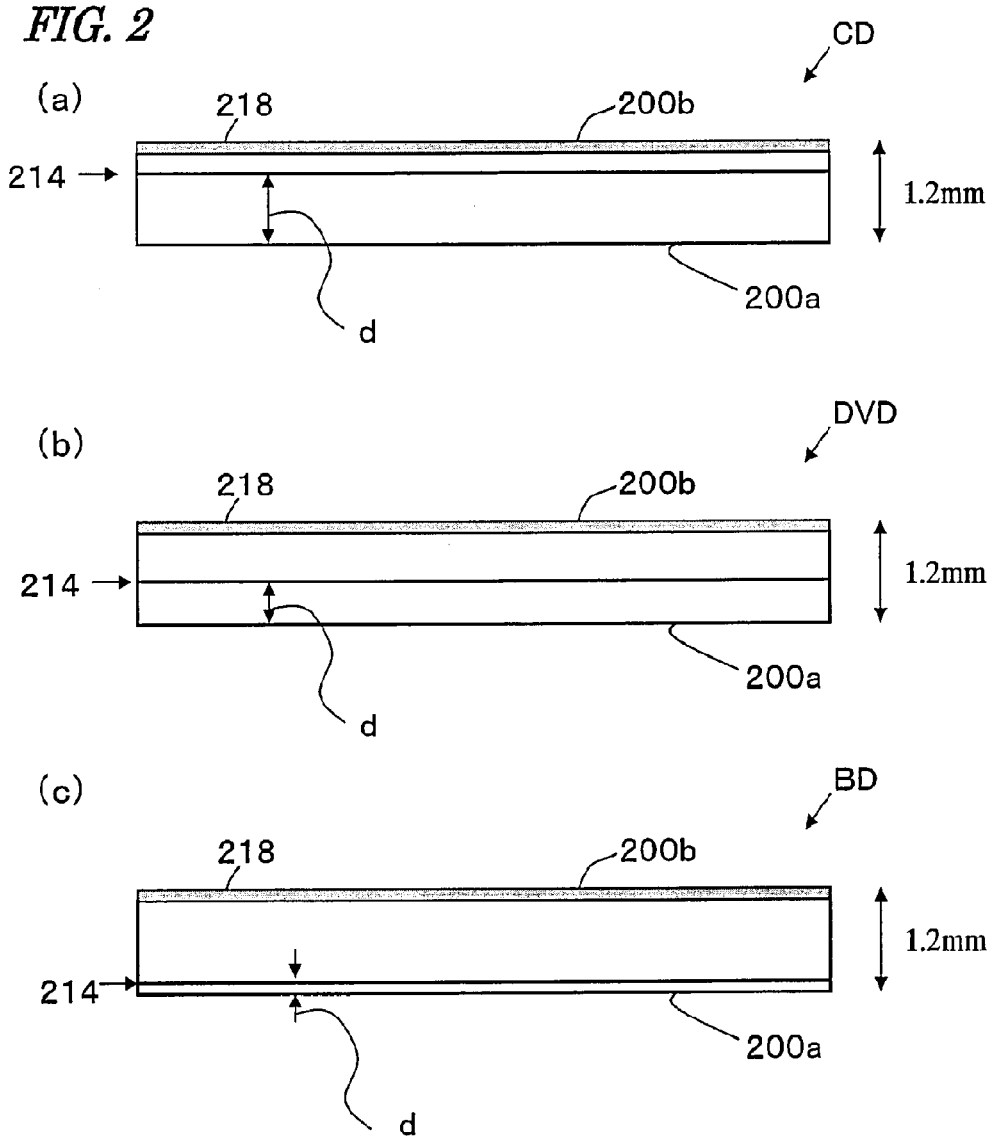
FIGS. 2(a), 2(b) and 2(c) schematically show cross sections of a CD, a DVD and a BD, respectively.

When the optical disk drive shown in FIG. 1 is loaded with an optical disk, the type of the optical disk is unknown for the drive. In this preferred embodiment, immediately after the optical disk has been inserted, the controller 5 issues an initial rotation instruction to the rotation control section 3 and also instructs the blue laser driving section 24 to radiate a blue ray with initial optical power for reading. In this case, the rotational velocity of the motor may be set to be 1,000 rpm, for example.

After the disk 1 has started to be turned at the rotational velocity, the controller 5 sends a signal to the blue laser driving section 24, thereby making the blue laser 23 emit a blue ray in Step S100. Next, in Step S101, the controller 5 gets the objective lens 22 moved up and down by the actuator, thereby recognizing the type of the disk by reference to the level of the focus error (FE) signal, that of an all sum (AS) signal or a combination thereof. In this preferred embodiment, the disk type recognition is carried out with the objective lens moved toward the optical disk and with the number of S-curves appearing on the focus error signal counted (such an operation will be referred to herein as a "first disk type recognition operation"). In this case, the focal point of the light beam passes the information storage layer of the optical disk in just a short time. That is why even though the rotational velocity of the motor is as low as 1,000 rpm, no read beam induced deterioration should happen.

If the given optical disk 1 is recognized as a BD as a result of the first disk type recognition operation, then the rotational velocity of the motor is increased to 3,800 rpm (which is the first rotational velocity) in Step S102. In this case, the decision of Step S102 may be wrong, i.e., the optical disk 1 may not be a BD actually. The optical disk that is most likely to cause read beam induced deterioration by being irradiated with the blue light beam (with a wavelength of 405 nm) is a CD-R. Therefore, if the optical disk 1 is actually a CD-R, the risk of causing the read beam induced deterioration increases. That is why the first rotational velocity is preferably set to such a value as not causing the read beam induced deterioration during the focus control operation irrespective of the type of the given optical disk 1 that may be a CD, a DVD or a BD. As for a CD-R that is most likely to cause read beam induced deterioration by being irradiated with a blue light beam with a wavelength of 405 nm, the normal linear velocity is defined to be 1.2 m/s to 1.4 m/s. In the optical disk turning at a rotational velocity of 3,800 rpm, the lowest linear velocity is 9.54 m/s, which is much higher than the standardized normal linear velocity. Consequently, if the first rotational velocity is set to be 3,800 rpm, the read beam induced deterioration is hardly caused even if the optical disk 1 is actually a CD that has been inserted upside down or a DVD with a small substrate thickness.

Next, in Step S103, a focus finding operation is carried out on the target information storage layer and a focus control is started such that the absolute value of the focus error signal is always minimized. After the focus control has been turned ON, a tracking error signal is generated in Step S104 from the optical disk and it is determined based on the tracking error signal whether the optical disk is a BD or not (which will be referred to herein as a "second disk type recognition operation"). If the answer is YES, a tracking error signal with predetermined amplitude can be obtained. Otherwise, no appropriate tracking error signal can be obtained. That is why if such an appropriate tracking error signal has been obtained, then the given optical disk 1 can be recognized as a BD.

If the optical disk 1 is recognized as a BD in Step S104, address information is further read and more detailed data about the optical disk is acquired based on the information that has been read out from the management area of the optical disk 1. Then, the process advances to Step S105, in which the rotational velocity of the optical disk is set to be a second rotational velocity by reference to the detailed data about the optical disk. Thereafter, in Step S106, a read/write operation is started. The second rotational velocity may or may not be equal to the first rotational velocity.

If data is read from the optical disk 1 in Step S106, the optical disk 1 is irradiated with a blue light beam 21 and its reflected light is detected by the photodetector 16 with the focus control and tracking control performed. The output of the photodetector 16 is supplied to the reading section 18 by way of the preamplifier 17. In the reading section 18, the output signal is decoded by a decoder (not shown), thereby reading the data from the optical disk 1.

On the other hand, if data is written on the optical disk 1 in Step S106, a known writing section (not shown) outputs a signal to the blue laser driving section 24, thereby modulating the power of the blue light beam 21 according to the user data to be written on the optical disk 1. By modulating the recording power of the light beam 21 appropriately, a recording mark is left on the information storage layer of the optical disk 1, thereby getting the data written there.

Next, it will be described what if the optical disk 1 has not turned out to be a BD as a result of the recognition operation of Step S101 or S104. In that case, the process advances to Step S108 according to this preferred embodiment. When the process advances to Step S108, BD is no longer a candidate for the optical disk 1, and therefore, the optical disk 1 loaded can be either a DVD or a CD. Of these two types, the optical disk that deals with the shorter wavelength is a DVD.

The controller 5 issues a rotation instruction to change the first rotational velocities to the rotation control section 3 and also instructs the red laser driving section 10 to radiate a red ray with initial optical power for reading. In this preferred embodiment, when the red laser 7 radiates a red ray with the predetermined power, the rotational velocity of the motor is set to be such a value as causing no read beam induced deterioration during the focus control operation, irrespective of the type of the optical disk 1 loaded (which may be any type of DVD or CD). More specifically, the first rotational velocity is set to be 2,300 rpm, for example. The optical disk that is most likely to cause read beam induced deterioration by being irradiated with a red light beam with a wavelength of 605 nm is a CD-R, of which the normal linear velocity is defined to be 1.2 m/s to 1.4 m/s. In the optical disk turning at a rotational velocity of 2,400 rpm, the lowest linear velocity is 6.0 m/s, which is much higher than the standardized normal linear velocity. Consequently, the read beam induced deterioration is hardly caused even if the optical disk 1 is a CD.

After the disk 1 has started to be turned at the rotational velocity in Step S109, a focus control on the target information storage layer is started in Step S110. Thereafter, in Step S111, it is determined based on the tracking error signal generated from the optical disk 1 whether the optical disk is a DVD or not. If the answer is YES, a tracking error signal with predetermined amplitude can be obtained. Otherwise, no appropriate tracking error signal can be obtained. If such an appropriate tracking error signal has been obtained, address information is read and more detailed data about the optical disk is collected based on the information that has been read from the management area.

Then, in Step S112, the rotational velocity of the optical disk is set to be a second rotational velocity by reference to the detailed data about the optical disk. Thereafter, in Step S113, a read/write operation is started. The second rotational velocity may or may not be equal to the first rotational velocity.

Next, it will be described what if the optical disk 1 has not turned out to be a DVD as a result of the recognition operation of Step S111. In that case, the process advances to Step S114 shown in FIG. 5B. When the process advances to Step S114, BD and DVD are no longer candidates for the optical disk 1, and therefore, the optical disk 1 loaded will be a CD. In Step S114, the infrared laser radiates an infrared ray. Next, in Step S115, the rotational velocity of the motor is set to be such a value as causing no read beam induced deterioration during the focus control operation. More specifically, the first rotational velocity is set to be 2,400 rpm, for example.

After a focus control has been started in Step S116, it is determined in Step S117 based on the tracking error signal generated from the optical disk 1 whether the optical disk is a CD or not. If the answer is YES, a tracking error signal with predetermined amplitude can be obtained. Otherwise, no appropriate tracking error signal can be obtained. If such an appropriate tracking error signal has been obtained, address information is read and more detailed data about the optical disk is collected based on the information that has been read from the management area.

Then, in Step S118, the rotational velocity of the optical disk is set to be a second rotational velocity by reference to the detailed data about the optical disk. Thereafter, in Step S119, a read/write operation is started. The second rotational velocity may or may not be equal to the first rotational velocity.

If the optical disk has not turned out to be a CD in Step S117, the optical disk is ejected as an incompatible disk and a spin operation is carried out to stop the laser and the motor.

In the preferred embodiment described above, after it has been determined in Step S104 that the optical disk 1 is not a BD, disk type recognition is carried out using a red light beam. However, the present invention is in no way limited to such a specific preferred embodiment. Alternatively, when it is determined in Step S104 that the optical disk 1 is not a BD, the process may advance to Step S114 shown in FIG. 5B. In that case, if it is determined in Step S117 that the optical disk is not a CD, the process advances to Step S108 shown in FIG. 5A.

Optionally, after Step S108 has been performed and before the focus control is started, an additional processing step of recognizing the type of the optical disk 1 by detecting the S-curves of the focus error signal using the red light beam may also be carried out. Furthermore, after Step S114 has been performed and before the focus control is started, an additional processing step of recognizing the type of the optical disk 1 by detecting the S-curves of the focus error signal using the infrared light beam may also be carried out.

As described above, this preferred embodiment is characterized in that disk type recognition is carried out while a focus control is performed with the optical disk turned at a high velocity using a blue light beam.

It should be noted that after the drive has been started and before the focus control is begun, there is no concern about read beam induced deterioration and the rotational velocity of the optical disk may be decreased to a low value. That is why in Step S101, the rotational velocity of the optical disk does not have to be as high a value as 3,800 rpm but may be decreased to 1,000 rpm, for example, to carry out the disk type recognition. Alternatively, before this processing step S101 is performed, the rotational velocity of the optical disk 1 may also be set to be the first rotational velocity of 3,800 rpm. The point is that the rotational velocity of the optical disk needs to have been increased sufficiently before the focus control is started.

Embodiment 2

Hereinafter, a second preferred embodiment of an optical disk drive according to the present invention will be described with reference to FIG. 6. The configuration of this preferred embodiment is basically the same as, but is different from, that shown in FIG. 1 in that a switch 31 is arranged near the disk motor 2. If any of the components of the optical disk drive has the same function as the counterpart of the optical disk drive of the first preferred embodiment, the description of that pair of components will be omitted herein.

In the first preferred embodiment described above, after the optical disk 1 has been inserted, the optical head 6 is displaced by the transport stage 11 to the vicinity of the innermost area of the disk. This is done to bring the optical head 6 as close to the lead-in area (which is hardly affected by the axial runout or disk flutter and where control data is stored) or to the area where management information is stored as possible.

In the innermost area of the optical disk, stored is the management information. That is why if the disk type recognition operation is carried out on this area, the important management information could be destroyed by the read beam induced deterioration. It is fatal to have the management information destroyed in this way. In this preferred embodiment, when the optical head 6 is displaced toward the inner edge of the optical disk by the transport control section 13 after the optical disk has been inserted, the optical head 6 is kept moving until the head 6 presses the switch 31 attached to the motor 2. Thereafter, the optical head 6 is displaced toward the outer edge of the disk for a predetermined distance by reference to the position where the optical head 6 has contacted with the switch 31. If the transport stage 11 uses a stepping motor, this displacement is carried out by applying a predetermined number of pulses to the stepping motor. On the other hand, if the transport stage 11 uses a DC motor, then a predetermined voltage may be applied to the DC motor for a prescribed amount of time.

By displacing the optical head 6 from the innermost location on the disk toward the outer edge thereof in this manner, the light beam spot can be shifted outside of the area where the management information is stored.

The magnitude of displacement of the optical head 6 from the innermost location on the disk (i.e., the distance to travel for the optical head 6) changes according to the eccentricity of the disk and the radial location error of the optical head caused by the transport stage 11. In this preferred embodiment, the magnitude of this displacement is defined within the range of 5 mm to 15 mm (e.g., approximately 5 mm or more).

After that, the same operations as those already described for the first preferred embodiment are carried out. That is why should the read beam induced deterioration be caused, the chances of having the important data destroyed in the essential management area would be even slimmer.

In the preferred embodiments described above, the optical disk drive can handle BDs, DVDs and CDs. However, the present invention is in no way limited to those specific preferred embodiments. Alternatively, the present invention is also applicable to an optical disk drive that handles HD-DVDs instead of BDs.

As for HD-DVD, the wavelength of a light beam used to read an HD-DVD is shorter than that of a light beam used to read a DVD. However, the distance from the surface of the disk to the information storage layer is no different between HD-DVD and DVD. That is why when disk type recognition is carried out using a blue light beam, an HD-DVD or a DVD can be easily distinguished from a CD just as described above. However, error is more likely to occur in distinguishing an HD-DVD from a DVD than in distinguishing a BD from a DVD. Nevertheless, if a DVD were taken for an HD-DVD by mistake and if a focus control had been started, the tracking error signal would be modulated by the blue light beam to a different degree on the DVD than on an HD-DVD. Thus, the optical disk loaded could be eventually recognized as a DVD by its amplitude. In this case, even if the focus control using the blue light beam were working on the DVD's information storage layer, no read beam induced deterioration should be caused on the DVD as long as the rotational velocity (i.e., linear velocity) is sufficiently high.

The present invention is also applicable to an optical disk drive that can handle at least two types of optical disks among BDs, DVDs, and CDs. In an optical disk drive that can deal with BDs and DVDs, if the optical disk loaded has turned out to be a non-BD as a result of disk type recognition using a blue light beam, then the blue light beam is switched into a read light beam. On the other hand, in an optical disk drive that can deal with BDs and CDs, if the optical disk loaded has turned out to be a non-BD as a result of disk type recognition using a blue light beam, then the blue light beam is switched into an infrared light beam.

The present invention may also be carried out as a piece of firmware for an optical disk drive. In that case, the present invention may be implemented as a program that can be executed by the controller 5, for example. The program may be either installed in the optical disk drive in advance, get stored in the optical disk drive by way of a storage medium, or downloaded via a network and then stored in the optical disk drive.

INDUSTRIAL APPLICABILITY

The optical disk drive of the present invention can be used effectively as an apparatus for reading and writing data from/on multiple types of recordable optical disks including CDs, DVDs and BDs.

The invention claimed is:

1. An optical disk drive for reading and writing data from/on multiple types of optical disks, the drive comprising:

a motor to rotate one of the optical disks thereon;

an optical head including a light source for radiating a plurality of light beams with mutually different wavelengths and a photodetector for generating an electrical signal based on at least a part of the light beam that has been reflected from the optical disk; and a control section for performing an operation of recognizing the type of the optical disk, a focus control operation and a tracking control operation by controlling the operations of the optical head and the motor, wherein the control section performs the steps of:

(A) after the optical disk drive has been loaded with the optical disk and before the operation of recognizing the type of the optical disk is finished, presuming one of the multiple types of candidate optical disks, from/on which data is readable and writable using a light beam with the shortest wavelength among the candidate disks, to be the optical disk being driven by the motor now and radiating the light beam for the presumed type of optical disk from the light source;

(B) rotating the optical disk at a rotational velocity that realizes a linear velocity that is higher than a standardized normal velocity when data is read from the presumed type of optical disk prior to a focus control;

(C) starting the focus control in a situation where the spot of the light beam being formed on the optical disk is moving on the optical disk at the linear velocity that is higher than the normal velocity; and (D) performing the operation of recognizing the type of the optical disk by the light beam that has been reflected from the optical disk under the focus control.

2. The optical disk drive of claim 1, wherein after the step (A) has been performed and before the focus control or the tracking control is started, a spot of the light beam is formed on the optical disk and the operation of recognizing the type of the optical disk by the light beam that has been reflected from the optical disk is started.

3. The optical disk drive of claim 1, wherein on finding the type of the optical disk being driven by the motor different from that of the optical disk, from/on which data is going to be read or written using the light beam, after having performed the steps (A) through (D), the control section performs the steps of:

(A') switching the light beam into a second light beam having a longer wavelength than the light beam, and radiating the second light beam from the light source;

(B') rotating the optical disk spun at a rotational velocity that realizes a linear velocity that is higher than the standardized normal velocity of the optical disk, from/on which data is going to be read or written using the second light beam prior to a focus control;

(C') starting the focus control in a situation where the spot of the second light beam being formed on the optical disk is moving on the optical disk at the linear velocity that is higher than the normal velocity; and (D') performing the operation of recognizing the type of the optical disk by the light beam that has been reflected from the optical disk under the focus control.

4. The optical disk drive of claim 3, wherein after the step (A') has been performed, a spot of the second light beam is formed on the optical disk and the operation of recognizing the type of the optical disk by the second light beam that has been reflected from the optical disk is started.

5. The optical disk drive of claim 3, wherein on finding the type of the optical disk being driven by the motor different from that of the optical disk, from/on which data is going to be read or written using the second light beam, after having performed the steps (A) through (D) and the steps (A') through (D'), the control section performs the steps of:

(A") switching the light beam into a third light beam having a wavelength that is longer than that of the light beam that was radiated from the light source in the step (A) and that is different from that of the second light beam, and radiating the third light beam from the light source;

(B") rotating the optical disk at a rotational velocity that realizes a linear velocity that is higher than the standardized normal velocity of the optical disk, from/on which data is going to be read or written using the third light beam prior to a focus control;

(C") starting the focus control in a situation where the spot of the third light beam being formed on the optical disk is moving on the optical disk at the linear velocity that is higher than the normal velocity; and (D") performing the operation of recognizing the type of the optical disk by the light beam that has been reflected from the optical disk under the focus control.

6. The optical disk drive of claim 5, wherein after the step (A") has been performed, a spot of the third light beam is formed on the optical disk and the operation of recognizing the type of the optical disk by the third light beam that has been reflected from the optical disk is started.

7. The optical disk drive of claim 1, wherein the control section radiates the light beam with a wavelength of 410 nm or less from the light source in the step (A).

8. The optical disk drive of claim 7, wherein the control section rotates the optical disk at a rotational velocity that realizes a linear velocity of more than 5.28 m/s [or more] in the step (B).

9. The optical disk drive of claim 3, wherein the control section radiates the light beam with a wavelength of 410 nm or less and the second light beam, having a wavelength for DVDs, radiated from the light source in the steps (A) and (A'), respectively.

10. The optical disk drive of claim 9, wherein the control section rotates the optical disk at a rotational velocity that realizes a linear velocity of more than 5.28 m/s [or more] in the step (B) and at a rotational velocity that realizes a linear velocity of more than 3.87 m/s [or more] in the step (B'), respectively.

11. An optical disk drive for reading and writing data from/on multiple types of optical disks, the drive comprising:

a motor to rotate one of the optical disks thereon;

an optical head including a light source for radiating a plurality of light beams with mutually different wavelengths and a photodetector for generating an electrical signal based on at least a part of the light beam that has been reflected from the optical disk; and a control section for performing an operation of recognizing the type of the optical disk, a focus control operation and a tracking control operation by controlling the operations of the optical head and the motor, wherein the control section performs the steps of:

(A) after the optical disk drive has been loaded with the optical disk and before the operation of recognizing the type of the optical disk is finished, presuming one of the multiple types of candidate optical disks, from/on which data is readable and writable using a light beam with the shortest wavelength among the candidate disks, to be the optical disk being driven by the motor now and radiating the light beam for the presumed type of optical disk radiated from the light source;

(B) rotating the optical disk spun at a rotational velocity that realizes a linear velocity that is higher than a standardized normal velocity when data is read from the presumed type of optical disk prior to a focus control;

(C) starting the focus control in a situation where the spot of the light beam being formed on the optical disk is moving on the optical disk at the linear velocity that is higher than the normal velocity; and (D) performing the operation of recognizing the type of the optical disk by the light beam that has been reflected from the optical disk under the focus control; and wherein on finding the type of the optical disk being driven by the motor different from that of the optical disk, from/on which data is going to be read or written using the light beam, after having performed the steps (A) through (D), the control section performs the steps of:

(A') switching the light beam into a second light beam having a longer wavelength than the light beam, and radiating the second light beam radiated from the light source;

(B') rotating the optical disk spun at a rotational velocity that realizes a linear velocity that is higher than the standardized normal velocity of the optical disk, from/on which data is going to be read or written using the second light beam prior to a focus control;

(C') starting the focus control in a situation where the spot of the second light beam being formed on the optical disk is moving on the optical disk at the linear velocity that is higher than the normal velocity; and (D') performing the operation of recognizing the type of the optical disk by the light beam that has been reflected from the optical disk under the focus control; and wherein the control section radiates the light beam with a wavelength of 410 nm or less and the second light beam, having a wavelength for CDs, radiated from the light source in the steps (A) and (A'), respectively.

12. The optical disk drive of claim 11, wherein the control section rotates the optical disk at a rotational velocity that realizes a linear velocity of more than 5.28 m/s in the step (B) and at a rotational velocity that realizes a linear velocity of more than 1.4 m/s in the step (B'), respectively.

*13. An optical disk drive for reading data from multiple types of optical disks, the drive comprising:*

*a motor to rotate one of the optical disks thereon;*

*an optical head including a light source for radiating a plurality of light beams with mutually different wavelengths and a photodetector for generating an electrical signal based on at least a part of the light beam that has been reflected from the optical disk; and*

*a control section for performing an operation of recognizing the type of the optical disk, a focus control operation and a tracking control operation by controlling the operations of the optical head and the motor,*

*wherein the control section performs the steps of:*

*(A) after the optical disk drive has been loaded with the optical disk and before the operation of recognizing the type of the optical disk is finished, presuming one of the multiple types of candidate optical disks, from which data is readable using a light beam with the shortest wavelength among the candidate disks, to be the optical disk being driven by the motor now and radiating the light beam for the presumed type of optical disk from the light source;*

*(B) rotating the optical disk at a rotational velocity that realizes a linear velocity that is higher than a standardized normal velocity when data is read from the presumed type of optical disk prior to a focus control;*

*(C) starting the focus control in a situation where the spot of the light beam being formed on the optical disk is moving on the optical disk at the linear velocity that is higher than the normal velocity; and*

*(D) performing the operation of recognizing the type of the optical disk by the light beam that has been reflected from the optical disk under the focus control.*

*14. The optical disk drive of claim 13, wherein after the step (A) has been performed and before the focus control or the tracking control is started, a spot of the light beam is formed on the optical disk and the operation of recognizing the type of the optical disk by the light beam that has been reflected from the optical disk is started.*

*15. The optical disk drive of claim 13, wherein on finding the type of the optical disk being driven by the motor different from that of the optical disk, from which data is going to be read using the light beam, after having performed the steps (A) through (D), the control section performs the steps of:*

*(A') switching the light beam into a second light beam having a longer wavelength than the light beam, and radiating the second light beam from the light source;*

*(B') rotating the optical disk at a rotational velocity that realizes a linear velocity that is higher than the standardized normal velocity of the optical disk, from which data is going to be read using the second light beam prior to a focus control;*

*(C') starting the focus control in a situation where the spot of the second light beam being formed on the optical disk is moving on the optical disk at the linear velocity that is higher than the normal velocity; and*

*(D') performing the operation of recognizing the type of the optical disk by the light beam that has been reflected from the optical disk under the focus control.*

*16. The optical disk drive of claim 15, wherein after the step (A′) has been performed, a spot of the second light beam is formed on the optical disk and the operation of recognizing the type of the optical disk by the second light beam that has been reflected from the optical disk is started.*

*17. The optical disk drive of claim 15, wherein on finding the type of the optical disk being driven by the motor different from that of the optical disk, from which data is going to be read using the second light beam, after having performed the steps (A) through (D) and the steps (A′) through (D′), the control section performs the steps of:*

*(A″) switching the light beam into a third light beam having a wavelength that is longer than that of the light beam that was radiated from the light source in the step (A) and that is different from that of the second light beam, and radiating the third light beam from the light source;*

*(B″) rotating the optical disk at a rotational velocity that realizes a linear velocity that is higher than the standardized normal velocity of the optical disk, from which data is going to be read using the third light beam prior to a focus control;*

*(C″) starting the focus control in a situation where the spot of the third light beam being formed on the optical disk is moving on the optical disk at the linear velocity that is higher than the normal velocity; and*

*(D″) performing the operation of recognizing the type of the optical disk by the light beam that has been reflected from the optical disk under the focus control.*

*18. The optical disk drive of claim 17, wherein after the step (A″) has been performed, a spot of the third light beam is formed on the optical disk and the operation of recognizing the type of the optical disk by the third light beam that has been reflected from the optical disk is started.*

*19. The optical disk drive of claim 13, wherein the control section radiates the light beam with a wavelength of 410 nm or less from the light source in the step (A).*

*20. The optical disk drive of claim 19, wherein the control section rotates the optical disk at a rotational velocity that realizes a linear velocity of more than 5.28 m/s in the step (B).*

*21. The optical disk drive of claim 15, wherein the control section radiates the light beam with a wavelength of 410 nm or less and the second light beam, having a wavelength for DVDs, from the light source in the steps (A) and (A′), respectively.*

*22. The optical disk drive of claim 21, wherein the control section rotates the optical disk at a rotational velocity that realizes a linear velocity of more than 5.28 m/s in the step (B) and at a rotational velocity that realizes a linear velocity of more than 3.87 m/s in the step (B′), respectively.*

*23. An optical disk drive for reading data from multiple types of optical disks, the drive comprising:*

*a motor to rotate one of the optical disks thereon;*

*an optical head including a light source for radiating a plurality of light beams with mutually different wavelengths and a photodetector for generating an electrical signal based on at least a part of the light beam that has been reflected from the optical disk; and*

*a control section for performing an operation of recognizing the type of the optical disk, a focus control operation and a tracking control operation by controlling the operations of the optical head and the motor,*

*wherein the control section performs the steps of:*

*(A) after the optical disk drive has been loaded with the optical disk and before the operation of recognizing the type of the optical disk is finished, presuming one of the multiple types of candidate optical disks, from which data is readable using a light beam with the shortest wavelength among the candidate disks, to be the optical disk being driven by the motor now and radiating the light beam for the presumed type of optical disk from the light source;*

*(B) rotating the optical disk at a rotational velocity that realizes a linear velocity that is higher than a standardized normal velocity when data is read from the presumed type of optical disk prior to a focus control;*

*(C) starting the focus control in a situation where the spot of the light beam being formed on the optical disk is moving on the optical disk at the linear velocity that is higher than the normal velocity; and*

*(D) performing the operation of recognizing the type of the optical disk by the light beam that has been reflected from the optical disk under the focus control; and*

*wherein on finding the type of the optical disk being driven by the motor different from that of the optical disk, from which data is going to be read using the light beam, after having performed the steps (A) through (D), the control section performs the steps of:*

*(A′) switching the light beam into a second light beam having a longer wavelength than the light beam, and radiating the second light beam from the light source;*

*(B′) rotating the optical disk at a rotational velocity that realizes a linear velocity that is higher than the standardized normal velocity of the optical disk, from which data is going to be read using the second light beam prior to a focus control;*

*(C′) starting the focus control in a situation where the spot of the second light beam being formed on the optical disk is moving on the optical disk at the linear velocity that is higher than the normal velocity; and*

*(D′) performing the operation of recognizing the type of the optical disk by the light beam that has been reflected from the optical disk under the focus control; and*

*wherein the control section radiates the light beam with a wavelength of 410 nm or less and the second light beam, having a wavelength for CDs, from the light source in the steps (A) and (A′), respectively.*

*24. The optical disk drive of claim 23, wherein the control section rotates the optical disk at a rotational velocity that realizes a linear velocity of more than 5.28 m/s in the step (B) and at a rotational velocity that realizes a linear velocity of more than 1.4 m/s in the step (B′), respectively.*

* * * * *